United States Patent
Connerat

[11] 3,817,570
[45] June 18, 1974

[54] TRANSPORT CARRIER AND CONTAINER SECURING STRUCTURE

[75] Inventor: Edwin B. Connerat, Alexandria, Va.

[73] Assignee: Hennessy Products Incorporated, Chambersburg, Pa.

[22] Filed: Mar. 28, 1972

[21] Appl. No.: 238,821

[52] U.S. Cl. ........ 296/35 A, 105/366 B, 248/361 R
[51] Int. Cl. ............................................. B62d 27/06
[58] Field of Search... 296/35 A; 105/366 A, 368 B, 105/366 C; 280/DIG. 8; 248/361 R, 119 R

[56] References Cited
UNITED STATES PATENTS

| | | | |
|---|---|---|---|
| 3,027,025 | 3/1962 | Tantlinger | 296/35 A |
| 3,034,825 | 5/1962 | Harlander | 296/35 A |
| 3,111,341 | 11/1963 | Fujioka et al. | 296/35 A |
| 3,158,106 | 11/1964 | Clejan | 296/35 A |
| 3,399,921 | 9/1968 | Trost et al. | 248/361 R |
| 3,486,787 | 12/1969 | Campbell | 296/35 A |
| 3,682,423 | 8/1972 | Scarborough | 248/361 R |

Primary Examiner—David Schonberg
Assistant Examiner—John A. Pekar
Attorney, Agent, or Firm—Bedell and Burgess

[57] ABSTRACT

A transport container carrier transverse end framing member including the mounting of a container-engaging latch projectible from and retractible within the member, and an actuating device therefor receivable within the member when the latch is projected to engage the container. Preferably the actuating device includes a force-multiplying mechanism to facilitate manual operation. The member may embody a console structure receiving air, electric or other lines leading from the container to the truck by which the carrier is transported.

6 Claims, 7 Drawing Figures

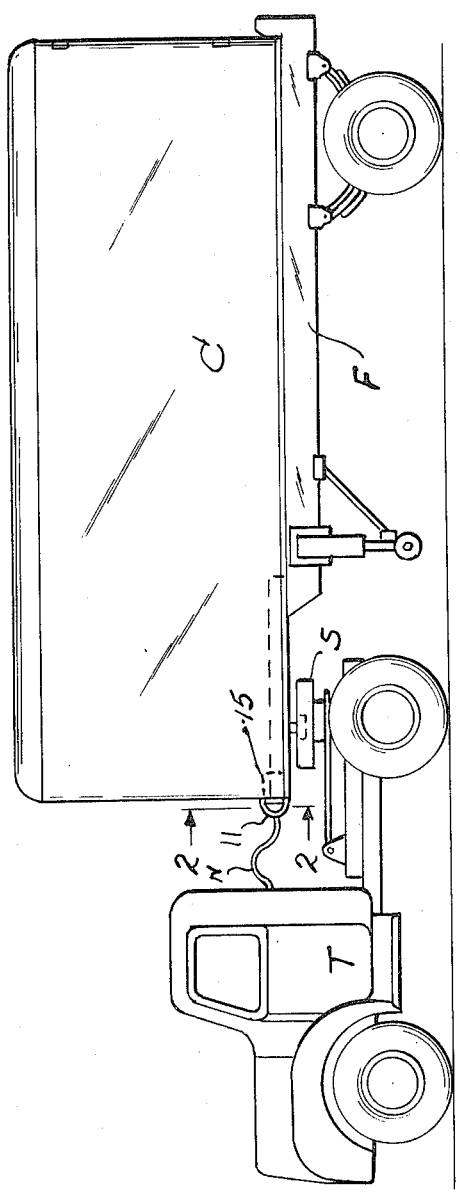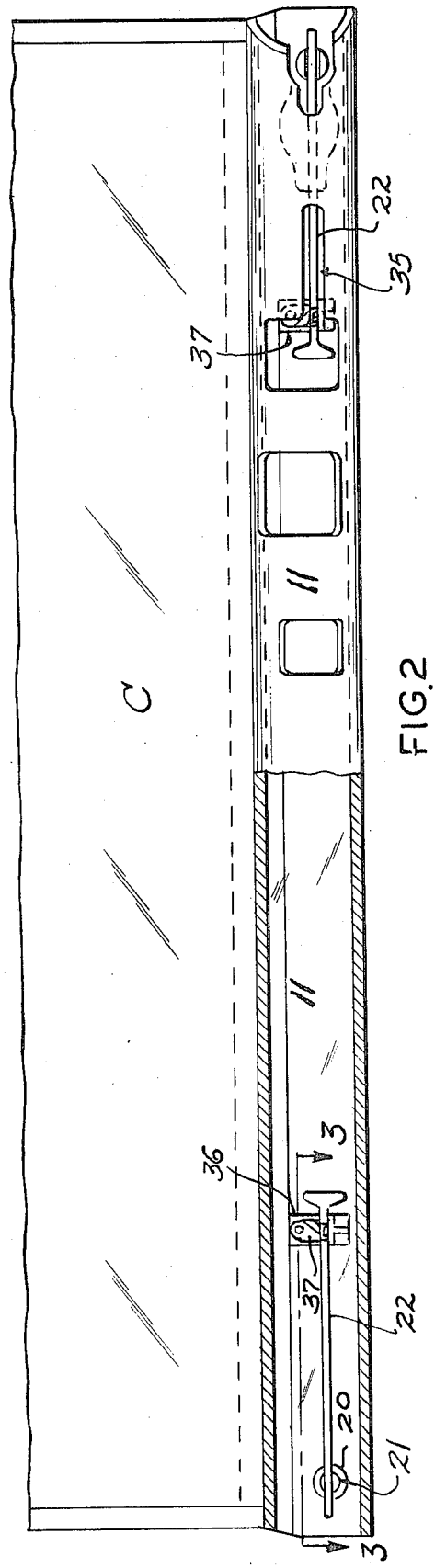

3,817,570

TRANSPORT CARRIER AND CONTAINER SECURING STRUCTURE

1. Field of the Invention

The invention relates to securing a merchandise container to a carrier including the mounting of a container-engaging latch pin, projectible from and retractible within a transverse elongated housing on the carrier and an actuating device therefor receivable within the housing when the latch pin is projected to engage the container.

2. Description of the Prior Art

Various devices have been used for similar purposes, most of them involving expensive mechanisms or difficult operations, such as turrets, linkages, chains, bolts and upstanding posts or brackets, which may be inconveniently in the way when the carrier does not mount a container.

SUMMARY OF THE INVENTION

The objects of the invention are to provide a simple latching device between a carrier and a container mounted thereon and preferably received within a housing or console provided on the carrier and enclosing air brake or lighting conduits between the container and tractor. The structure includes a simple effective mechanical means for amplifying manual effort used in shifting the latching device.

BRIEF DESCRIPTION OF THE DRAWINGS

FIG. 1 shows a motor truck with a trailer carrier mounting a merchandise container and indicating the position of the interengaging parts of the carrier and container.

FIG. 2 is in part a front elevation of the housing member and in part a vertical section on line 2—2 of FIG. 1.

DETAILED DESCRIPTION

The trailer chassis shown in FIG. 1 includes a frame F, the forward or gooseneck portion of which is supported on the fifth wheel 5 of tractor T and includes a transverse housing or console 11 at its forward end to enclose connections N for air brake piping and signal lamp wiring on container C and also the securing mechanism described below.

Figure 3:
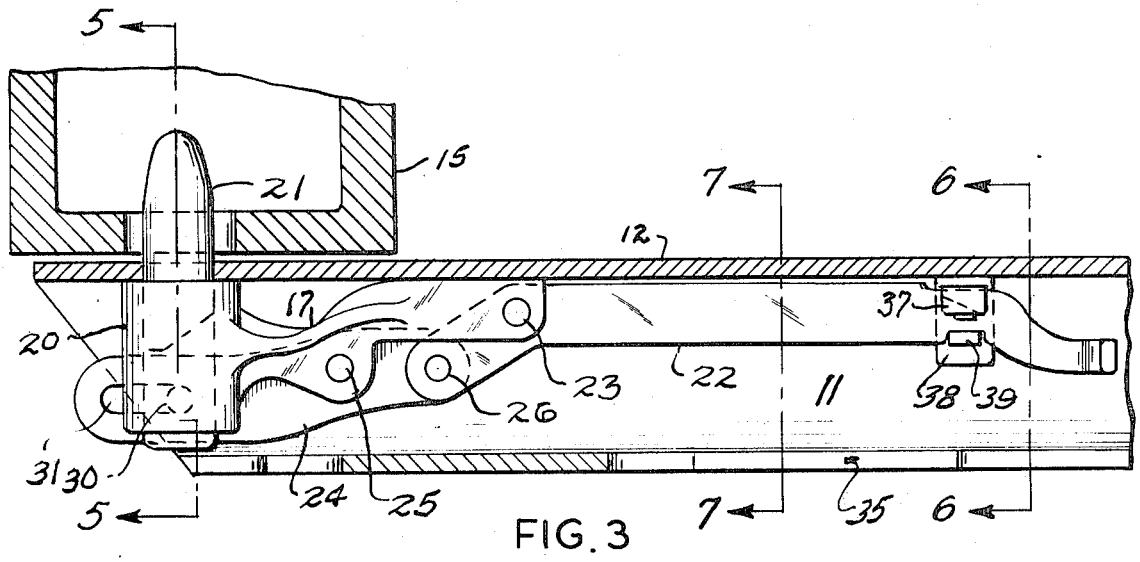
FIGS. 3 and 4 are horizontal sections through the housing taken on line 3—3 of FIG. 2 and showing the securing latch pin projected into the container and retracted therefrom respectively.
Figure 4:
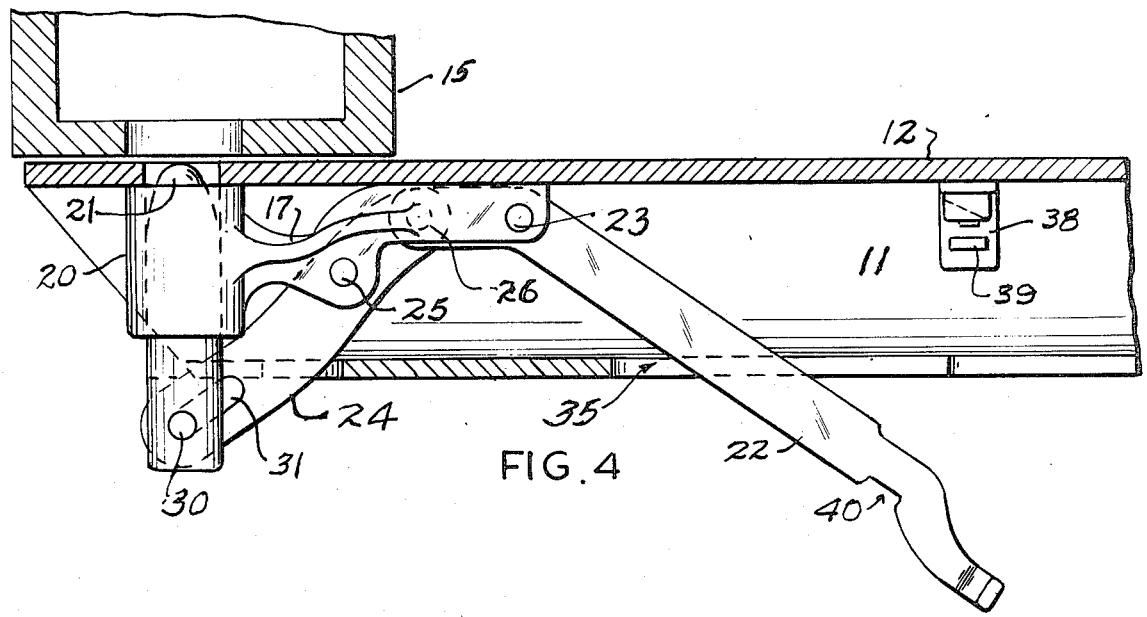
Figure 5:
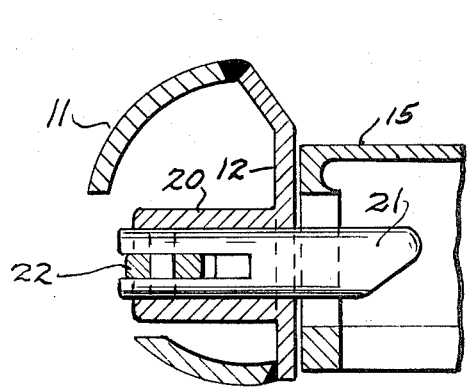
FIGS. 5, 6 and 7 are vertical sections on lines 5—5, 6—6 and 7—7 of FIG. 3.
Figure 6:
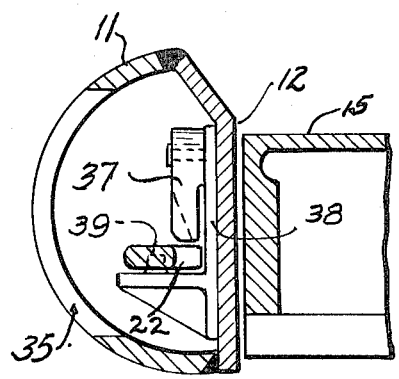
Figure 7:
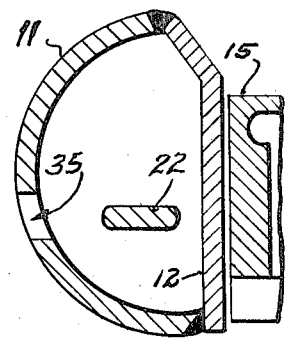

Merchandise container C is equipped with lower corner castings 15 (FIGS. 3, 4) and when the container and carrier are assembled, castings 15 abut or adjoin the upright wall 12 of housing 11.

Within housing 11 is a bracket 17 (FIGS. 3, 4) welded to the housing upright wall 12 near each end of the latter. The bracket includes a sleeve 20 and a latch pin 21 is slidable in sleeve 20 from a retracted position (FIG. 4) to a projected position (FIG. 3) in which it enters an opening in the adjacent corner casting 15 of the container to hold the container to the chassis.

Pin 21 may be actuated manually by a compound lever including a power lever 22, fulcrumed at 23 on bracket 17, and a work lever 24 fulcrumed at 25 on bracket 17. The outer end of lever 24 has a pin and slot connection 30, 31 to the rear end of latch pin 21. Sleeve 20 is slotted horizontally to receive arm 24. A pivot pin 26 connects lever 22 and 24.

Housing 11 has an elongated T-shaped slot 35 in its outer wall abreast of each lever 22. A workman may insert his hand through the wider portion of slot 35 and raise a gravity or spring-actuated catch 37, pivoted on a bracket 38 on wall 12, to release lever 22, and then lift the handle to disengage it from a lug 39 on bracket 38, which is received in a notch 40 in lever 22, and then pull lever 22 outwardly to the position shown in FIG. 4, thus retracting pin 21 from the container corner casting 15 and permitting the forward end of the merchandise container to be freed from the chassis. The leverage afforded by elements 22, 24 facilitates the retraction, or insertion, of the latch pin into and out of the corner casting even if they are not accurately aligned.

The securing structure may be used independently of or in combination with other securing devices and, if desired, it may be positioned at the opposite end of the chassis or intermediate the ends of the container.

The structure may be varied otherwise in details while embodying the invention claimed herein and the exclusive use of modifications or additions to the description coming within the scope of the claims is contemplated.

I claim:

1. Structure for securing a merchandise container to a supporting chassis having a hollow elongated member with transversely spaced upright walls, said structure comprising a latch mounted in said hollow member below the top thereof and axially projectible and retractible laterally through one of said walls to engage and disengage the container, the manually actuable mechanism accessible through said other wall for moving the latch as described, said manually actuable mechanism comprising a compound lever having a pair of levers each fulcrumed intermediate its ends on a vertical axis within said hollow member, the axes of said levers being spaced apart longitudinally of said hollow member, said levers having adjacent ends pivotally connected to each other, one of said levers being connected at its remote ends to said latch, the remote end of the other lever providing a handle, said levers being movable between a generally aligned latch-projecting position within said hollow member and extending longitudinally thereof, to a disaligned latch-retracting position partially projecting from said hollow member.

2. In a chassis for carrying a merchandise container, a hollow elongated frame member, a latch element laterally retractible axially within said member and axially projectible therefrom for engaging a merchandise container and securing it to the chassis, and mechanism mounted in the member for actuating said latch element, said mechanism comprising a compound lever having a pair of levers each fulcrumed intermediate its ends on a vertical axis within said hollow member, the axes of said levers being spaced apart longitudinally of said hollow member, said levers having adjacent ends pivotally connected to each other, one of said levers being connected at its remote ends to said latch, the remote end of the other lever providing a handle, said levers being movable between a generally aligned latch-projecting position within said hollow member and extending longitudinally thereof, to a disaligned latch-retracting position partially projecting from said hollow member.

3. A chassis as described in claim 2 in which the hollow member extends transversely of the chassis and forms a housing for air line and electric connections, and the latch element and the actuating mechanism therefor is accessible through a wall opening spaced from said connections.

4. A chassis as described in claim 3 in which the latch element is positioned near one end of the member and the actuating mechanism is positioned inwardly near the transverse center of the chassis.

5. A chassis as described in claim 2 in which the hollow frame member extends transversely of the chassis, there being air line and electric connections contained within said member accessible through openings in the member wall, and the actuating mechanism being accessible through an opening in the member wall spaced from said connection openings.

6. A chassis as described in claim 5 which includes duplicate latch elements and actuating mechanisms therefor spaced apart lengthwise of the hollow frame member, there being air line and electric connections positioned intermediate said latch elements and actuating mechanisms.

* * * * *

UNITED STATES PATENT OFFICE
CERTIFICATE OF CORRECTION

Patent No. 3,817,570              Dated June 18, 1974

Inventor(s) Edwin B. Connerat

It is certified that error appears in the above-identified patent and that said Letters Patent are hereby corrected as shown below:

Column 2, line 36, "the manually actuable" should read --and manually actuable--.

Signed and sealed this 8th day of October 1974.

(SEAL)
Attest:

McCOY M. GIBSON JR.                 C. MARSHALL DANN
Attesting Officer                   Commissioner of Patents